Aug. 27, 1963 L. R. BOSEN 3,102,238

ENCODER WITH ONE FREQUENCY INDICATINC ONE BINARY LOGIC STATE AND ANOTHER FREQUENCY INDICATING OTHER STATE

Filed Nov. 13, 1961 3 Sheets-Sheet 1

INVENTOR.
LYNN R. BOSEN
BY Moody and Phillion
ATTORNEYS

INVENTOR.
LYNN R. BOSEN
BY Moody and Phillion
ATTORNEYS

INVENTOR.
LYNN R. BOSEN
BY Moody and Phillion
ATTORNEYS

United States Patent Office 3,102,238
Patented Aug. 27, 1963

3,102,238

ENCODER WITH ONE FREQUENCY INDICATING ONE BINARY LOGIC STATE AND ANOTHER FREQUENCY INDICATING OTHER STATE

Lynn R. Bosen, Costa Mesa, Calif., assignor to Collins Radio Company, Cedar Rapids, Iowa, a corporation of Iowa Filed Nov. 13, 1961, Ser. No. 151,700
9 Claims. (Cl. 328—27)

This invention relates generally to a structure for encoding binary information by means of shifting frequency and, more specifically, it relates to a means for encoding binary information which employs a half cycle of a signal of one frequency for either a mark or a space and a full cycle of a signal of a second frequency twice that of the first frequency with virtually no abrupt changes in the resultant intelligence-bearing signal, thus improving bandwidth usage.

There are in the prior art many methods of structures for encoding binary information. Some of these structures or methods employ multicycle signal bursts having particular phase relationships (phased pulse data) which represent either a mark or a space. Other systems employ pulse bursts whose frequencies are shifted to indicate the type of bit represented, i.e., either a mark or a space. While both of these systems have many useful applications and have been well developed in the arts, there are certain disadvantages attendant with both systems. For example, the system employing the phased pulse bursts requires some reference phase against which any received bursts can be related in order to identify the intelligence carried in the pulse bursts. The means for producing such a reference phase is often complicated. Furthermore, in a phased pulse burst perturbations of phase sometimes occur due to noise. With respect to frequency shift keying (FSK) perturbations of frequency sometimes occur altering the original frequency.

It would mark a definite improvement in the art to provide structures which would encode binary information in a simpler form than has heretofore been employed, and provide increased data handling capacity for a given bandwidth.

An object of the invention is to provide a structure for encoding binary information wherein a half cycle of a signal of the first frequency is employed to designate either a mark or a space, and wherein a full cycle of a signal having twice the frequency of the first signal is employed to designate the other type of data bit.

A further object of the invention is to provide a frequency shift keying method of encoding information wherein two frequencies are employed, one of said frequencies being twice the other, and with a half cycle of the lower frequency being employed to represent a mark or a space, and a full cycle of the higher frequency being employed to represent the other type data bit; the transition between frequencies always occurring at the peak of the sine wave employed in the two signals.

A further object of the invention is the improvement of means for transmitting binary information, generally.

In accordance with the invention there is provided a reference signal generated by a suitable means, such as an oscillator. The frequency of this reference signal is divided by a digital divider to frequency $f_1$, for example, 4800 c.p.s. A subsequent divider divides the 4800 c.p.s. signal down to a second frequency $f_2$ equal to 2400 c.p.s. Pulse forming circuit means, including monostable multivibrator, respond to the output signal of said subsequent divider to produce a pulsating output having a repetition rate equal to that of the said subsequent divider, e.g., 2400 c.p.s. Two "nor" gates are provided, each having two inputs with the output of the first divider being supplied to one of the inputs of one of the "nor" gates and the output of the multivibrator being supplied to one of the inputs of the second "nor" gate. The data input is received in the form of a two-level signal synchronized with the output of the second divider and is supplied directly to other input of the second "nor" gate and in an inverted form to the second input of the first "nor" gate. The "nor" gates are constructed to respond to the data inputs supplied thereto to be inhibited at one level of the data input signal. Thus, one of the "nor" gates is always inhibited during a mark bit and the other "nor" gate is always inhibited during the reception of a space bit. The outputs of the two "nor" gates are supplied to an "or" gate which combines the two signals. Such combined signal consists of a full two cycles of 4800 c.p.s. signal for each mark transmitted and a single short duration pulse for each space that is supplied to this system; the single short duration pulse representing space occurring in the center of the received space bit interval.

The resultant combined signal is supplied to a third divider circuit which is constructed to change states only upon the reception of a positive-going signal. By appropriate inversion of the two components making up the combined signal, the positive-going portions of the 4800 c.p.s. signal, representing a mark, will occur at the 90° and the 270° points thereof; whereas, the positive short duration pulses representing the spaces will occur at the midpoint of the half cycle representing a space type bit. Since all such transition points of the third frequency divider will, when filtered, represent zero crossings of the resultant sine wave, it can be seen that both the half cycle representing a mark and the full cycle representing a space will begin and terminate either at a positive or a negative peak. It will become apparent from the description hereinafter that the polarity of the peak of the termination of either a mark or a space will always coincide with the beginning of the next mark or space, thus eliminating any abrupt changes in signals and providing for a smooth, continuous flow of energy.

The above and other objects and features of the invention will be more fully understood from the following detailed description thereof when read in conjunction with the drawings in which.

FIGS. 4, 5, 6, and 7 illustrate how to create a 1200 c.p.s. subharmonic.

Figure 1:
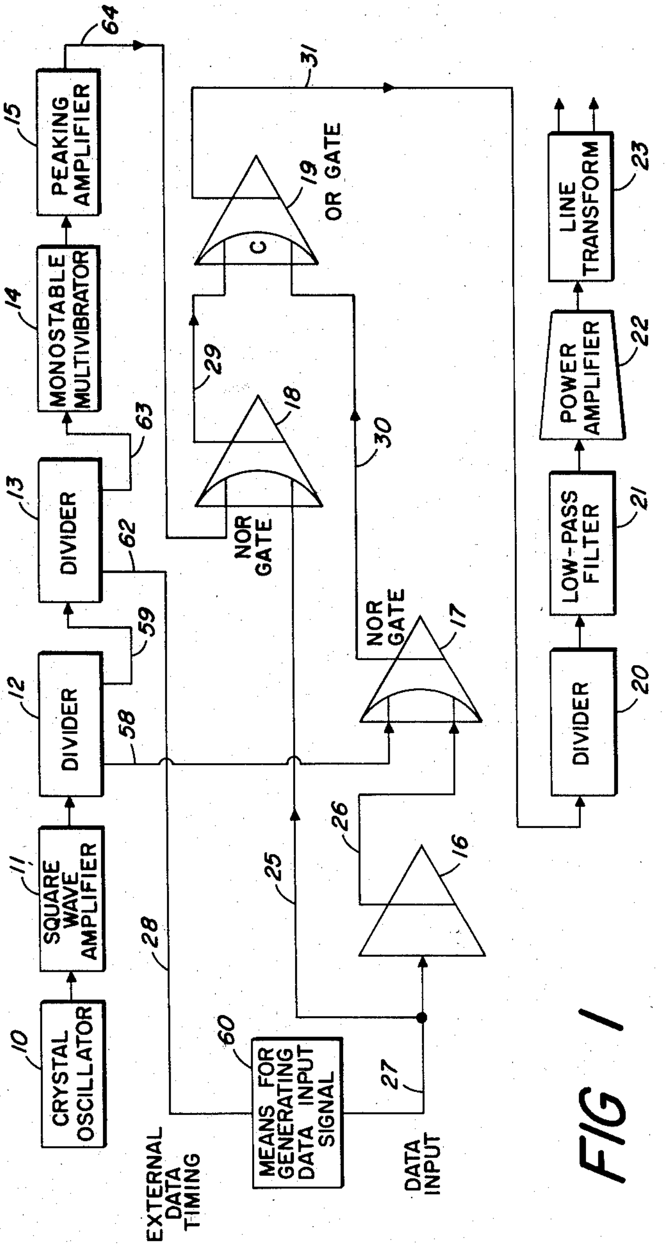
FIG. 1 is a block diagram of the invention.

Referring now to FIG. 1, a suitable oscillator, such as crystal oscillator 10, is provided to generate a certain frequency. It should be noted at this point that many different frequencies can be employed in the invention. For purposes of a specific illustration, however, assume that the crystal oscillator is constructed to generate a frequency of 9.6 kc.

The output of oscillator 10 is supplied to a square wave amplifier 11, the output of which is in turn supplied to a first divider means 12, which divides the 9.6 kc. signal down to a 4800 c.p.s. signal appearing at the output terminals 58 and 59. The signal appearing at output terminal 59 is a square wave signal as shown in curve 59' of FIG. 2. It is to be noted that the output signal appearing on lead 58 (not shown in FIG. 2) is the inverted form of square wave 59'. The output signal on lead 59 is supplied to a second divider 13 and the output signal on lead 58 is supplied to "nor" gate 17.

As in the case of divider 12, the divider 13 has two outputs which are both 2400 c.p.s. square waves and which are reciprocals of each other and are supplied to different circuits. The output signal appearing on lead 62 (shown in curve 62' of FIG. 2) is supplied to circuit means 60 which is a circuit for generating the data input signal. The said means 60 is responsive to the output from divider 13 to be synchronized therewith.

As will become more apparent later, it is necessary in a synchronous bit information system that the data bits are synchronized with the output of divider 13.

Figure 2:
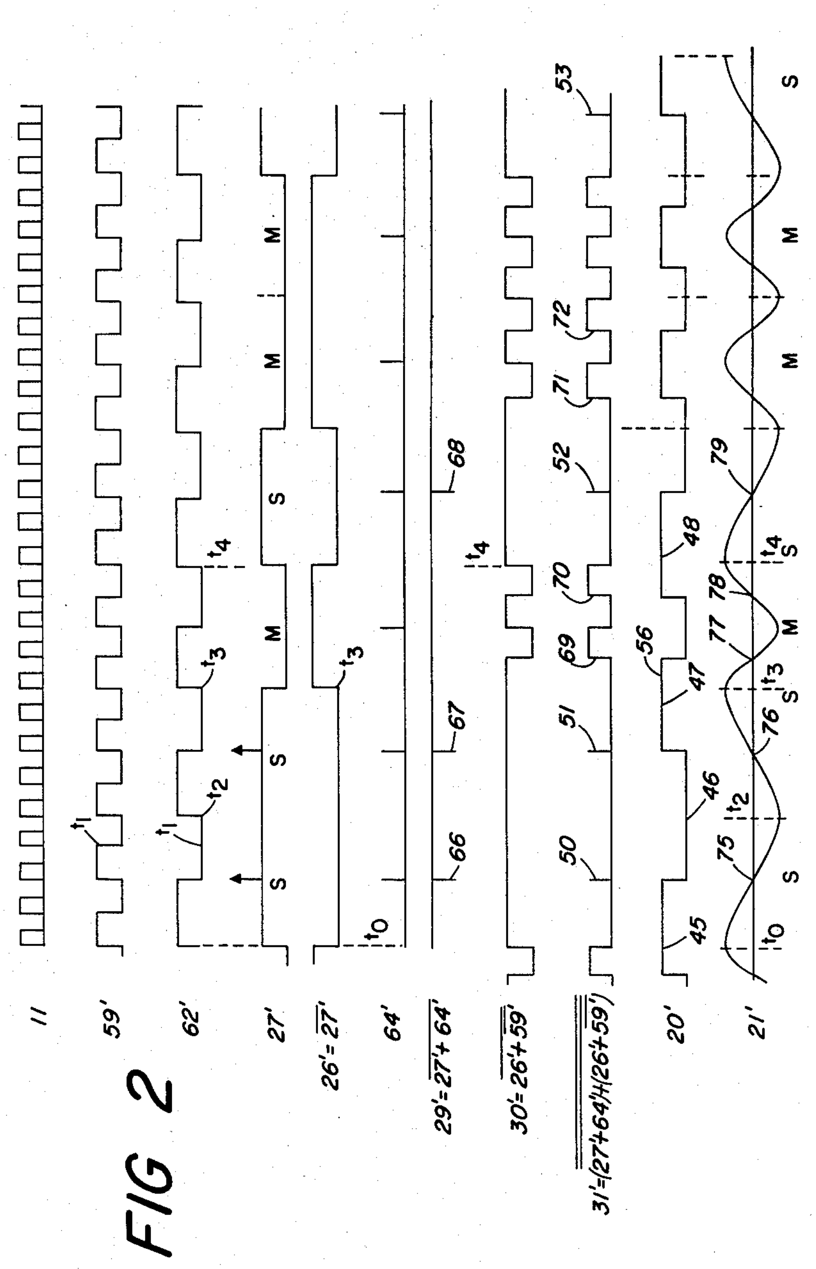
FIG. 2 shows a series of curves representing the voltage at the various points in the circuit of FIG. 1 and shows the logic of the operation of the structure of FIG. 1.

The other output terminal 63 of divider 13 is connected to monostable multivibrator 14 and the peak amplifier 15 which function to produce the series of pulses shown in curve 64' of FIG. 2. It will be noted that the pulses of curve 64' have a repetition rate equal to the frequency of the output signal of divider 13. The output of monostable multivibrator 14 and the peaking amplifier 15 is then supplied to one input lead of the "nor" gate 18.

It should be noted at this point that a bar over the number representating a curve in FIG. 2 indicates inversion of such curve. Thus "$\overline{27'}$" in curve 26 indicates an inversion of curve 27.

The data input signal is supplied directly from the source 60 to the "nor" gate 18 and through the inverter 16 to the "nor" gate 17. Such data input is represented by the curve 27' of FIG. 2 and can be seen to be a two-level D.C. signal, one level representing spaces and the other level representing marks. The choice of which level is to represent which type of data bit is arbitrary. In the curve 27' of FIG. 2 the upper level is designated as indicating a space and the lower level as indicating a mark. Both of the "nor" gates 17 and 18 are caused to be opened; that is, to pass information when the data input supplied thereto is at its high level. Thus, the gate 18 will be opened when a space is present and only when a space is being received. Due to the presence of the inverter 16 the gate 17 will be opened only when a mark is being received. Thus, either gate 17 or gate 18 will be opened at all times during the reception of intelligence, but only one will be opened at a given time. When open, the gates 17 and 18 will pass information received from the divider 12 and the peak amplifier 15, respectively. More specifically, when open, the gate 17 will pass the signal appearing on the output lead 58 of divider 12, which information will be inverted in gate 17 and will be similar to the waveform shown in curve 59'. Gate 18 when opened, will pass the information shown in curve 64', which information will be inverted by the "nor" gate 18, as shown in curve 29', which represents the output signal of "nor" gate 18. The gate 19 is different from gates 17 and 18 in that it passes any signal appearing on leads 29 or 30 and inverts said signals. Thus, the signal appearing on the output lead 31 is the sum of the inverted signals supplied to the gate 19 on the input leads 29 and 30.

Referring to the curves of FIG. 2, again assume that a data input, such as shown in curve 27', is being supplied to the data input lead 27. Such data input is supplied directly to the gate 18, which gate will function to pass pulses 66, 67, and 68 of the pulses appearing on the output lead 64 during the time that the first two spaces of curve 27' are being received.

During this time $t_0$ to $t_3$, however, the gate 17 is closed since the inverted form of the data input signal, as shown in curve 26', is being supplied to said gate 17, and is at its low level. Thus, the 4800 cycle per second signal from divider 12 is prevented from passing through gate 17. At time $t_3$, however, the data input signal changes from a space to a mark, as shown in curve 27'. The gate 18 now becomes closed and the gate 17 becomes open. As can be seen from the curve 29, no output pulse from the peaking amplifier 15 is passed through the gate 18 between the times $t_3$ and $t_4$. However, since the gate 17 is now open the 4800 c.p.s. signal from divider 12 (inverse of curve 59') is passed through said gate 17 and appears at the output lead 30 of gate 17, as shown in the curve 30' of FIG. 2. It will be noted that inversion has occurred both in the gate 17 and in gate 18. The two signals shown in curves 29' and 30' are then supplied to the "or" gate 19 which functions to produce the signal shown in curve 31' of FIG. 2. It is to be noted that inversion again occurs. The signal of curve 31' can be seen to consist of a series of pulses, such as pulses 50, 51, 52, and 53, and bursts of 4800 c.p.s. square wave signal, which corresponds to the reception of mark signals.

A third divider 20 is constructed to respond to all positive-going edges to change its state. Thus, the divider 20 will be caused to change state with the positive pulses 50, 51, 52, and 53, and the positive-going edges of the 4800 c.p.s. portion of curve 31, such as edges 69, 70, 71, and 72. The resultant output signal of the divider 20 is shown in curve 20' of FIG. 2.

By means of a low-pass filter 21, the output signal of divider 20 is transformed into the waveform of curve 21' of FIG. 2, which more closely resembles a sine wave function, and consists of two frequencies. One frequency is 2400 c.p.s. and the other frequency is 1200 c.p.s. More specifically, the portion of the cycle between times $t_2$ and $t_3$, for example, represents a half cycle of the 1200 c.p.s. signal and the portion of the signal existing between times $t_3$ and $t_4$ represents a full cycle of the 2400 c.p.s. signal; the half cycle of the 1200 c.p.s. signal representing a space wherever it occurs and the full cycle of the 2400 c.p.s. signal representing a mark wherever it occurs.

It will be noted that the transition from a space to a mark or a mark to a space is a smooth transition; that is to say, both the space and the mark signal will terminate at either a plus or a minus maximum amplitude level and the next following space or mark signal will begin at such positive or negative maximum level. Such transition is made possible by the fact that the divider 20 is caused to change states at the zero crossing of the signals; the spacing of the zero crossings determines whether the signal is a mark or a space. For example, the zero crossing 75 in curve 21' occurs a quarter cycle after time $t_0$ and, of course, is caused by the pulse 50 of curve 31' and the resultant transition of the divider 20, as shown in curve 20'. The next zero crossing of the curve 21' is shown at point 76 and is determined by the pulse 51 of curve 31' which causes a transition in divider 20, as shown in curve 20'. The point 76 is a full half cycle of 1200 c.p.s. signal removed from the point 75. It will be observed that the pulses 50 and 51 of curve 31' have been made to occur, by the action of monostable multivibrator 14 of FIG. 1, at a point in time one quarter wavelength (of a 1200 c.p.s. signal) removed from the beginning of the space bit time intervals which begin, respectively, at times $t_0$ and $t_2$. Such timing of pulses 50 and 51 of curve 31' will insure that the transition times of the divider 20 and, consequently, the zero crossings of the curve 23, will occur to form a signal having a period corresponding to the frequency of 1200 c.p.s. and a beginning and an ending at either a plus or minus maximum amplitude level.

At time $t_3$ of curve 21' it can be seen that a space bit is terminating in a mark bit is beginning. Here, again, the portion of the curve 21' between times $t_3$ and $t_4$ is formed by the transition times of the divider 20, as shown in curve 20'. Such transition times determine the zero crossings 77 and 78 of curve 21'. It will be observed that these zero crossings have been caused to occur at the quarter wavelength point and at the three-quarter wavelength point of a cycle of the 2400 c.p.s. signal, measured from time $t_3$. It will be noted from curve 31' that the positive-going edge 69 of the two-cycle burst of 4800 c.p.s. signal representing any given mark will always occur at a time $$\frac{\tau}{4}$$

after the beginning of the mark, $$\frac{\tau}{4}$$

being equal to one-quarter wavelength of the 2400 c.p.s. mark representing signal of curve 21'. Similarly, the last positive-going edge 70 of the 4800 cycle burst of curve 31' will occur at the $\frac{3}{4}\tau$ point of the 2400 c.p.s. signal, as shown at point 78 of curve 21'. Consequently, the divider 20 always changes states at such times as to determine the proper zero crossings.

Thus, as shown in curve 21', there is reproduced at the output of the low-pass filter 21 of FIG. 1 a signal, as shown in the curve 21', which is composed of a series of half cycles of the 1200 c.p.s. signal and whole cycles of 2400 c.p.s. signals representing, respectively, spaces and marks. Essentially, the system is a frequency shift keying system (FSK) in which the duration of the particular frequency is either a half wavelength or a whole wavelength long for each space or mark. The output of the low-pass filter is supplied to a power amplifier 22 and then to a line transformer 23.

Figure 3:
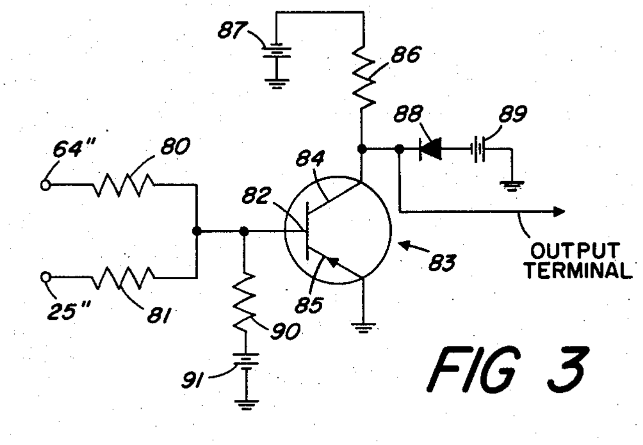
FIG. 3 shows a schematic diagram of the "nor" circuits.

Referring now to FIG. 3, there is shown a schematic diagram of the "nor" circuits 17, 18, and the "or" circuit 19 of FIG. 1. It should be noted that the circuit 19 performs the logical function of an "or" circuit by exactly the same circuit that performs the "nor" function of circuits 17 and 18. The specific reason for this will be noted hereinafter.

In the operation of the circuit of FIG. 3 it may be said, generally, that only two voltage levels are supplied to the input leads 64'' and 25'' thereof. Such voltage levels are either zero volts (ground potential) or a minus 6 volts. It might further be pointed out that if a minus 6 volts is supplied to either of the input leads 64'' or 25'', the normally nonconductive transistor 83 will become conductive. The positive battery source 91 functions to supply a potential to the base 82 of the transistor through resistor 90 to bias said transistor into a state of nonconductivity in the absence of a negative signal on either input leads 25'' or 64''. However, if a minus 6 volts does appear on either input lead 64'' or input lead 25'', the potential of base 82 of the transistor becomes sufficiently negative to cause conductivity thereof. Therefore, it can be seen that if a minus 6 volts is applied to lead 25'' from the data generator 60, the transistor 83 will be conductive regardless of the output signal from the peaking amplifier 15, which is supplied to input lead 64''. Thus, the output signal appearing at the collector electrode 84 of transistor 83 will be a constant value at substantially ground potential since the emitter 85 is grounded.

If, however, a high level signal, that is zero volts, is supplied to input lead 25'', the potential of the base 82 will be positive with respect to the emitter 85 so that the transistor 83 will, in the absence of a minus 6 volts on lead 64'', be nonconductive. Under such circumstances, the collector electrode 84 would tend to drift toward the minus 15-volt value of battery source 87 through resistor 86. However, the maximum negative excursion possible of collector electrode 84 is a minus 6 volts, which is determined by the clamping action of minus 6-volt battery 89 and diode 88. However, the transistor will ordinarily not become conductive since the output from the peaking amplifier 15 is a 6 volt pulse which has a base reference of minus 6 volts and only rises to ground potential during a peaking pulse. Thus, during the absence of a peaking pulse the negative 6 volts on input lead 64'' will cause the transistor 83 to be conductive so that the potential of the collector electrode will remain at about ground potential. It is only when a peaking pulse occurs to raise the potential of the input lead 64'' to ground potential that the conditions are met for the transistor 83 to become nonconductive. These conditions are that the potential supplied to both input leads 64'' and 25'' is ground potential. At such times the transistor 83 will become nonconductive and the potential of the collector electrode 84 will move toward the minus 15 volts of battery 87 through resistor 86. However, as indicated above, the maximum negative excursion permitted the collector electrode 84 is a minus 6 volts, determined by the clamping action of diode 88 and minus 6-volt battery 89.

Thus, it can be seen that the transistor 83 will pass information only when a high level signal is supplied to the input lead 25''.

The "nor" circuit 17 functions in the same manner as "nor" circuit 18 but will necessarily operate at alternate times with the "nor" circuit 18 since the output of the data generating means 60 is inverted before being supplied to "nor" circuit 17.

There will now be discussed briefly the reasons why the "or" circuit 19 can be the same circuit as the "nor" circuits 18 and 17. Referring to the curves 29' and 30' it will be noted that the potential thereon is always ground (with the transistor conductive) except when a space indicating pulse or a mark indicating burst occurs at which time the potential of either the lead 29' or 30' will drop to a −6 volts thus causing the transistor to become non-conductive. The change from a conductive state to a non-conductive state, will, of course, produce a change on the collector electrode potential, resulting in an output signal thereon as represented by curve 31'.

A unique receiver, designed especially for receiving and decoding the signal generated by the transmitter described herein, is described and claimed in copending United States patent application, Serial No. 150,786, filed November 7, 1961, by Kenneth H. Renshaw, entitled, "Single Tone Data Receiver." In the operation of such receiver it is desirable to generate a 1200 c.p.s. subharmonic from the 2400 c.p.s. portions of the received data information. Since it ordinarily is difficult to derive a subharmonic from a fundamental, such a subharmonic can be introduced into the transmitted signal. Specifically, such introduction of a 1200 c.p.s. signal is accomplished by means of the circuit shown in FIG. 4.

Figure 4:
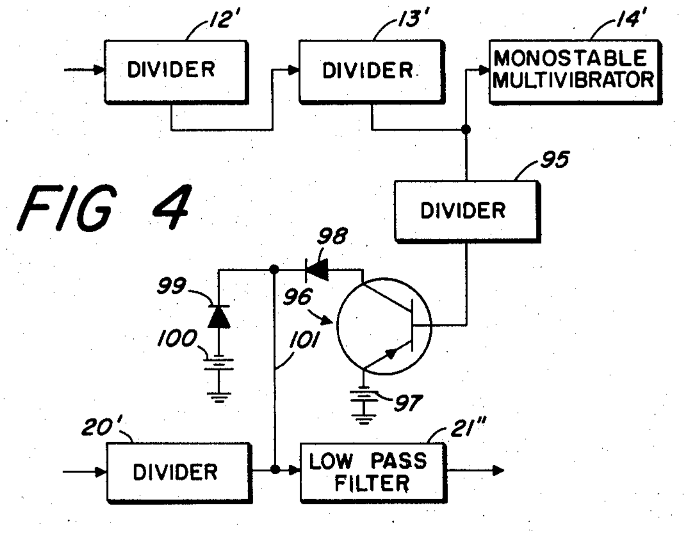

In FIG. 4 a portion of structure of FIG. 1 is reproduced, although it is to be understood that all of the structure of FIG. 1 is employed in FIG. 4. The blocks in FIG. 4 which correspond to blocks in FIG. 1 are identified by the same reference characters, although primed. The divider 95, the diodes 98 and 99, the minus 6-volt battery 100, the minus 5-volt battery 97 and the transistor 96, all of which are not shown in FIG. 1, perform the function of producing an approximate 5% amplitude modulation of the output signal of divider 20'. More specifically, the divider 95 functions to divide the 2400 c.p.s. output signal of divider 13' by 2 to produce a 1200 c.p.s. square wave output signal which is supplied to the base of the transistor 96. The two potential levels of said 1200 c.p.s. signal are such that during the high level portion thereof the transistor 96 is nonconductive and during the low level portion thereof the transistor 96 is conductive. During the time intervals that the transistor 96 is not conductive, the diode 99 and the minus 6-volt battery 100 functions to clamp the maximum negative excursion of the output signal of divider 20' to a minus 6 volts. However, during the intervals of time that the transistor 96 is conductive the impedance of transistor 96 will be very low and the diode 98 and the minus 5-volt battery source 97 will function to clamp the maximum negative excursion in the output signal of divider 20' to a minus 5 volts.

Figures 5, 6, 7:
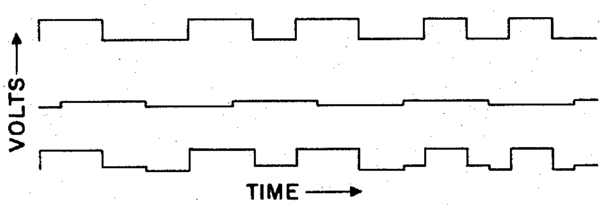

Thus, a small amplitude modulating signal of 1200 c.p.s. frequency, as shown in FIG. 6, is impressed upon the output signal of divider 20', which output signal is represented by the waveform of FIG. 5. It is to be understood that the waveform of FIG. 6, which is a two-level signal varying between −5 and −6 volts, represents a lower limit clamping voltage affecting only the lower level of the waveform of FIG. 5, and having no effect whatever upon the upper level of the waveform of FIG. 5. As in the case of all signals containing more than one component, the specific waveforms of FIG. 5 and FIG. 6 do not appear independently at the output of divider 20'; only the resultant waveform appearing thereat. Such resultant waveform is shown in FIG. 7 wherein the modulation of the waveform of FIG. 5 by the waveform of FIG. 6 appears only at the lower level. The waveform of FIG. 7 then passes through the low-pass filter 21 to produce a resultant output waveform similar to that of 21' of FIG. 2, but with a small amount of 1200 c.p.s. modulation impressed thereon.

It is to be noted that the specific form of the invention shown and described herein is a preferred embodiment thereof and that various changes may be made in circuit details and in the general over-all arrangement without departing from the spirit or scope of the invention.

I claim:

1. Means for generating an encoded bit synchronized signal comprising first signal generating means for producing a first square wave signal having a frequency $f_1$, second signal generating means for producing a second signal having a frequency $$\frac{f_1}{2}$$

and also a pulsating output signal having a repetition rate of $$\frac{f_1}{2}$$

and being phase locked with said second signal, means for generating a two-level data signal wherein a first level represents a space and the second level represents a mark, means for bit synchronizing said two-level data signal with said second signal, first gating means responsive to said pulsating output signal and the two-level data signal to reproduce those pulses of said pulsating signals which occur coincidentally only with a given level of said two-level data signal, other circuit means including second gating means responsive to the said first square wave signal and said two-level data input signal to produce a square wave output signal, having a frequency $f_1$, coincidentally only with the occurrence of the other level of said two-level data signal, third gating means constructed to respond to the output signals of said first and second gating means to produce a resultant signal comprised of the combined output signals of said first and second gating means, said first and second signal generating means and the two-level data generating means being constructed to produce output signals having phase relationships resulting in the voltage level at the end of each bit interval of said resultant signal being of the same value as the voltage level occurring at the beginning of the next succeeding bit.

2. Means for generating an encoded signal in accordance with claim 1 in which said first signal generating means is constructed to cause the signal derived therefrom and appearing in said resultant signal to have transitions of a given polarity occur at substantially $$\frac{N}{4}\tau_1$$

points in time measured from the beginning of a bit interval, where N is an odd integer and where $\tau_1$ is the period corresponding to the frequency $f_1$, and in which said second signal generating means is constructed to cause the output pulses derived therefrom and appearing in the said resultant signal to occur at substantially $$\frac{N}{4}\tau_2$$

points in time measured from the beginning of each bit interval, where N is an odd integer and where $\tau_2$ is the period corresponding to the frequency $$\frac{f_1}{2}$$

3. Means for generating an encoded signal in accordance with claim 2 comprising bistable means which is constructed to respond to each occurrence of said pulses in said resultant signal and to each change of said given polarity occurring in that portion of said resultant signal derived from the output signal of said first signal generating means, to change its state to produce a rectangularly shaped two-level output signal.

4. Means for generating an encoded signal in accordance with claim 3 comprising a low-pass filter means responsive to the output signal of said bistable means to produce a continuous A.C. waveform having zero crossings substantially corresponding to each transition in state of said bistable means.

5. Means for generating an encoded signal in accordance with claim 2 comprising means for producing a signal comprised of intermixed segments of the two frequencies $$\frac{f_1}{2}$$

and $$\frac{f_1}{4}$$

each segment having zero crossings at points substantially corresponding to the occurrence of the pulses in said resultant signal derived from said second signal generating means and to the occurrence of changes of said given polarity of that portion of the said resultant signal derived from the output of said first signal generating means.

6. Means for generating an encoded signal in accordance with claim 2 in which the period $\tau_2$ is equal to twice the period of a bit interval.

7. Means for generating an encoded signal in accordance with claim 6 comprising bistable means which is constructed to respond to each occurrence of said pulses in said resultant signal and to each change of said given polarity occurring in that portion of said resultant signal derived from the output signal of said first signal generating means, to change its state to produce a rectangularly shaped two-level output signal.

8. Means for generating an encoded signal in accordance with claim 7 comprising a low-pass filter means responsive to the output signal of said bistable means to produce a continuous A.C. waveform having zero crossings substantially corresponding to each transition in state of said bistable means.

9. Means for generating an encoded signal in accordance with claim 6 comprising means for producing a signal comprised of intermixed segments of the two frequencies $$\frac{f_1}{2}$$

and $$\frac{f_1}{4}$$

each segment generally having the shape of a sine wave, and having zero crossings at points substantially corresponding to the occurrence of the pulses in said resultant signal derived from said second signal generating means and to the occurrence of changes of said given polarity of that portion of the said resultant signal derived from the output of said first signal generating means.

References Cited in the file of this patent

UNITED STATES PATENTS

| | | |
|---|---|---|
| 2,735,014 | Rado | Feb. 14, 1956 |
| 2,983,872 | Williamson et al. | May 9, 1961 |